United States Patent [19]

Otake et al.

[11] Patent Number: 5,515,263

[45] Date of Patent: May 7, 1996

[54] ISOLATED SWITCHING POWER SOURCE

[75] Inventors: Tetushi Otake, Tokyo; Noriyuki Yoshizawa, Kawagoe, both of Japan

[73] Assignee: Toko, Inc., Tokyo, Japan

[21] Appl. No.: 396,460

[22] Filed: Feb. 28, 1995

[30] Foreign Application Priority Data

Mar. 9, 1994 [JP] Japan ................................. 6-066736

[51] Int. Cl.⁶ .................................................. H02M 3/335
[52] U.S. Cl. .............................. 363/97; 363/21; 323/902
[58] Field of Search ......................... 363/21, 97; 323/902

[56] References Cited

U.S. PATENT DOCUMENTS

| 4,378,585 | 3/1983 | Bete | 363/19 |
|---|---|---|---|
| 4,761,724 | 8/1988 | Brown et al. | 363/21 |
| 5,408,402 | 4/1995 | Nonnemacher | 363/21 |
| 5,420,498 | 5/1995 | Kramer | 323/293 |

*Primary Examiner*—Peter S. Wong
*Assistant Examiner*—Adolf Berhane
*Attorney, Agent, or Firm*—Dressler, Goldsmith, Shore & Milnamow, Ltd.

[57] ABSTRACT

An object of the present invention is to reduce a cost and a power consumption, eliminating a voltage source for generating a reference voltage in an isolated switching power source achieving a feedback from an output side of the power source to a control circuit in an input side of the power source through a photo-coupler. A voltage $V_1$ obtained by dividing an output voltage $V_0$ by a voltage dividing resistors 8, 9 is applied to a base of a transistor 11-1 for an error amplifier, and a photo-coupler light emitting element 10-1 is connected between an emitter of the transistor 11-1 and a negative side of an power source output. A forward dropping voltage of the photo-coupler light emitting element becomes approximately constant (approximately 1.1 v) over a variation range of a current flowing to the photo-coupler light emitting element at actually using time. Utilizing such a characteristic, it is possible to cause the photo-coupler 10-1 to have a function generating the reference voltage to be compared with the output voltage $V_0$ as well as a function achieving a feedback to the control circuit 5 in the input side of the power source.

7 Claims, 3 Drawing Sheets 5,515,263

ISOLATED SWITCHING POWER SOURCE

BACKGROUND OF THE INVENTION

1. Technical Field

This invention relates to an isolated switching power source in which the ground is separated in an input side and an output side of the power source.

2. Description of the Prior Art

In an isolated switching power source, in order to stabilize an output voltage for a voltage change of an input power source or a load change, a feedback from the output side to the input side of the power source by using a photo-coupler is achieved, thereby controlling a switching transistor in the input side of the power source.

FIG. 1 shows a circuit of a conventional isolated switching power source. In FIG. 1, the circuit comprises an input power source 1, capacitors 2, 7, a transformer 3, a switching transistor 4, a control circuit 5 of the switching transistor 4, a diode 6, voltage dividing resistors 8, 9, a photo-coupler light-receiving element 10-2 incorporated with a photo-coupler light-emitting element 10-1, an error amplifier 17, a reference voltage source 18 and a resistor 19.

A primary winding and a secondary winding of the transformer 3 are of opposite polarity each other as shown in FIG. 1 so that a voltage is induced in a direction of an arrow E when the switching transistor 4 is switched from ON to OFF by the control circuit 5. After the voltage induced in the secondary winding of the transformer 3 is rectified by the diode 6, an output voltage $V_0$ smoothed by the capacitor 7 is outputted. The output voltage $V_0$ is divided by the voltage dividing resistors 8, 9 and the divided voltage is inputted to the error amplifier 17. To another input terminal of the error amplifier 17, the reference voltage source 18 generating a reference voltage is connected so that a current corresponding to a difference between a voltage $V_1$ which is obtained by dividing the output voltage $V_0$ through the voltage dividing resistors 8, 9 and the reference voltage can flow to the photo-coupler light-emitting element 10-1. It should be noted that for example, a Zener diode or a band-gap voltage source is used as the reference voltage source 18.

When the current flows to the photo-coupler light-emitting element 10-1, it can emit quantity of the light corresponding to amount of the current and provide the photo-coupler light-receiving element 10-2 with the light. As a result, a feedback signal according to a difference between the reference voltage and the voltage $V_1$ is applied to the control circuit 5. The control circuit 5 performs ON and OFF control of the switching transistor 4 so as to maintain the constant output voltage $V_0$ based on the feedback signal. Like this, the conventional isolated switching power source has controlled the output voltage $V_0$.

SUMMARY OF THE INVENTION

In the conventional apparatus, it has disadvantages that the circuit structure becomes complicated and the cost is expensive because the reference voltage source for generating the reference voltage is needed. In addition, there was a problem that a power conversion efficiency has decreased because a waste power irrelevant to the output will be spent in the reference voltage source.

An object of the invention is to solve the disadvantages or the problem.

In order to solve the disadvantages or the problem, in an isolated switching power source accordance to the present invention for controlling a voltage by achieving a feedback of a result of comparing an output voltage with a reference voltage to a control circuit in an input side of the power source through a photo-coupler, a forward dropping voltage of the photo-coupler light-emitting element can be used as the reference voltage. Also, in order to compensate a variation based on a temperature change of the forward dropping voltage of the photo-coupler light-emitting element, a semiconductor element, more specifically, a diode is connected to a detecting means of the output voltage to input a signal to a means for comparing the output voltage with the reference voltage.

The forward dropping voltage of the photo-coupler light-emitting element used for the feedback to the control circuit in the input side of the power source is also utilized as a generating source of the reference voltage for an output of a feedback signal. Thereby the circuit will be simple and the cost will reduce because the reference voltage source needed in the conventional isolated switching power source becomes unnecessary. Also, a waste power which has been spent in the conventional reference voltage source can be prevented and a power conversion efficiency of the apparatus has increased because of no reference voltage source. Further, when the forward dropping voltage of the photo-coupler light-emitting element is used as the reference voltage, there is a case that a variation based on a temperature change is inconvenient. The variation of this forward dropping voltage causes a variation of the feedback signal to occur and as a result, the constant voltage cannot be maintained for an ambient temperature change. In order to prevent such a situation, it is considered to use a means for equivalently compensating the variation based on the temperature change of the forward dropping voltage by causing a divided voltage value of the output voltage as compared with the forward dropping voltage for the ambient temperature change to change at the same time and in the same level as the forward dropping voltage. Then, the present invention allows the constant output voltage to be maintained even though the ambient temperature changes, through compensating the variation of the forward dropping voltage based on the temperature change by connecting a diode to means for detecting the output voltage.

DESCRIPTION OF THE PREFERRED EMBODIMENTS

A detailed description of the preferred embodiments of the present invention is provided with respect to the figures.

Figure 1:
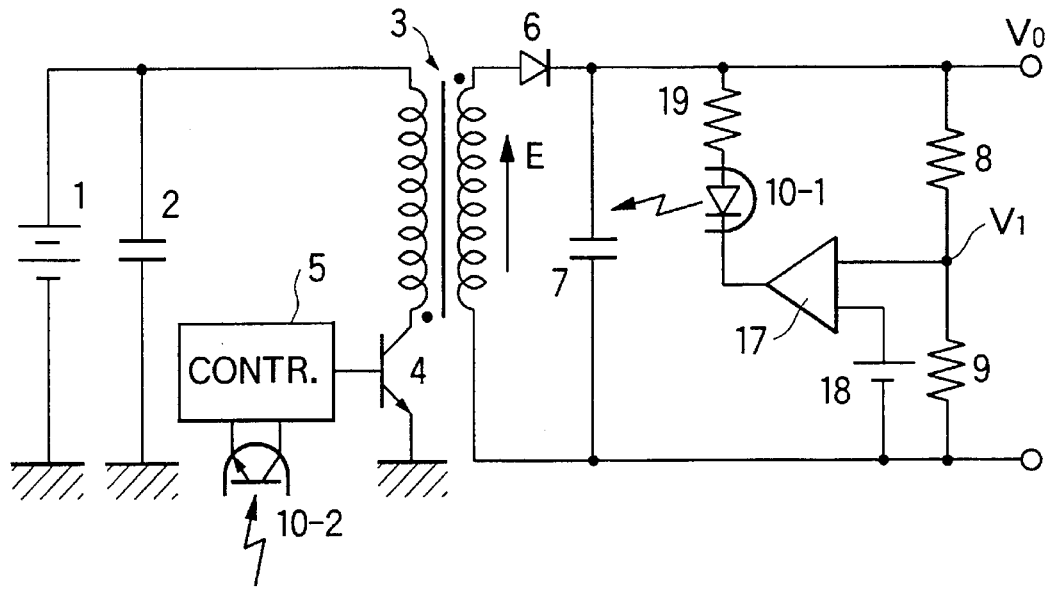
FIG. 1 is a circuit of a conventional isolated switching power source.
Figure 2:
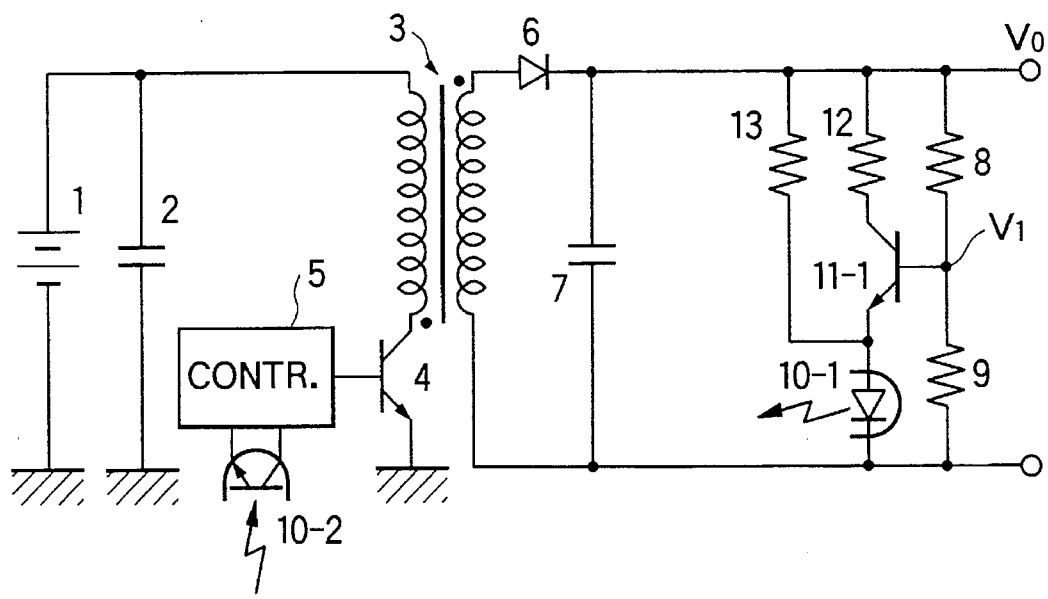
FIG. 2 is a circuit of the first embodiment according to the present invention.

FIG. 2 shows a circuit of the first embodiment according to the present invention. The numerical references in FIG. 2 correspond to those in FIG. 1 and numerical reference 11-1 is a transistor for an error amplifier and numerical references 12, 13 are resistors.

Voltage $V_1$ given, dividing the output voltage $V_0$ by voltage dividing resistors 8, 9 is applied to a base of the transistor 11-1 for the error amplifier, and a photo-coupler light emitting element 10-1 is connected between an emitter of the transistor 11-1 and a negative side of a power source output. The resistor 13 is connected between a positive side of the power source output and the emitter of the transistor 11-1.

A forward dropping voltage of the photo-coupler light emitting element has characteristics maintaining an approximately constant value (approximately 1.1 V) over a variation range of a current flowing to the element in its use. Taking note of this point, the present invention is to utilized the forward dropping voltage as a reference voltage comparing with the output voltage. In other word, omitting the conventional reference voltage source especially arranged for providing the reference voltage, the isolated switching power source according to the present invention is arranged so as to give a function as a source for generating the reference voltage to a photo-coupler used for achieving a feedback from an output side to an input side of the power source.

Operation of the main part according to the present invention, will be explained below.

The voltage $V_1$ given, dividing the output voltage $V_0$ by the voltage dividing resistors 8, 9 is applied to a base of the transistor 11-1. On the other hand, a voltage of the emitter is one appearing at an anode of the photo-coupler light emitting element 10-1. This voltage is amount of a forward dropping voltage of the photo-coupler light emitting element 10-1, so that a current according to a difference between the divided voltage $V_1$ and the forward dropping voltage of the photo-coupler light emitting element 10-1 flows between a collector and an emitter of the transistor 11-1. However, since the forward dropping voltage of the photo-coupler light emitting element 10-1 is kept approximately constant, if this constant voltage is selected as the reference voltage and the values of the voltage dividing resistors 8, 9 are predetermined to the appropriate values, the current flowing between the collector and the emitter of the transistor 11-1 becomes a value according to an error of the output voltage $V_0$.

As a result, since the current flowing to the photo-coupler light emitting element 10-1 as well as amount of generation of the light also becomes a value according to the error of the output voltage $V_0$, a signal according to the error of the output voltage $V_0$ is fed back to the control circuit through the photo-coupler light receiving element 10-2. Like this, it is possible to allow the photo-coupler light emitting element 10-1 to have both a function achieving the feedback to the input side of the power source and a function as a generating source of the reference voltage.

Figure 3:
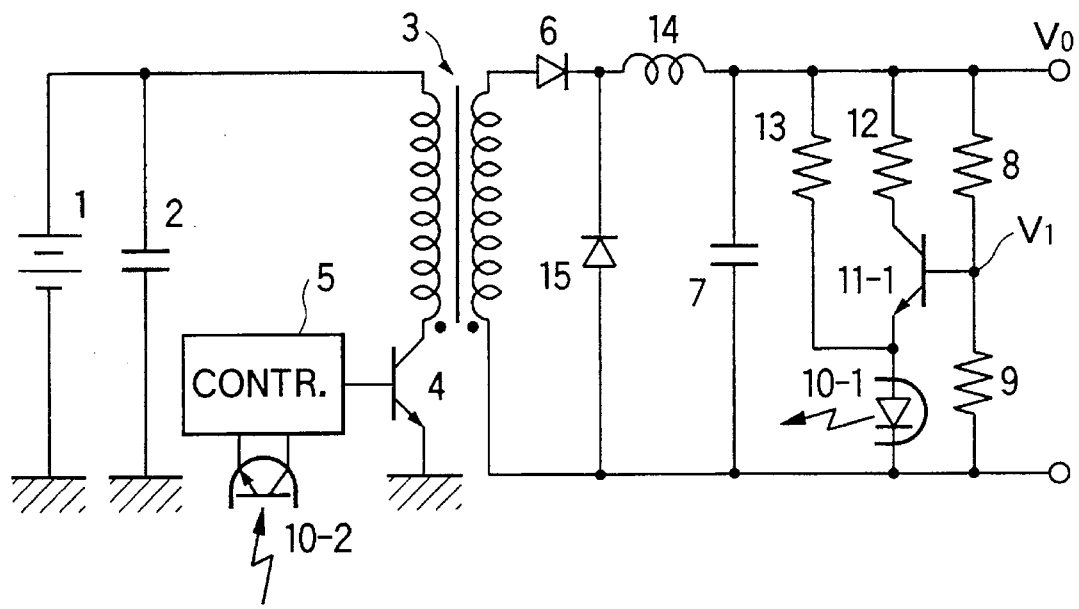
FIG. 3 is a circuit of the second embodiment according to the present invention.

FIG. 3 is a circuit of the second embodiment according to the present invention. Numerical references in FIG. 3 correspond to those in FIG. 2, and numerical numbers 14 and 15 are a choke coil and a diode, respectively. This embodiment represents a circuit in which a forward type isolated switching power source having polarity of the windings of transformer 3 which is opposite to that of FIG. 2 is applied. In this type of isolated switching power sources when switching transistor 4 is ON, an output voltage is obtained by rectifying and smoothing an voltage induced in the secondary winding, but there is no difference in operation and function of the transistor 11-1 and the photo-coupler light emitting element 10-1, so that explanation is omitted.

Figure 4:
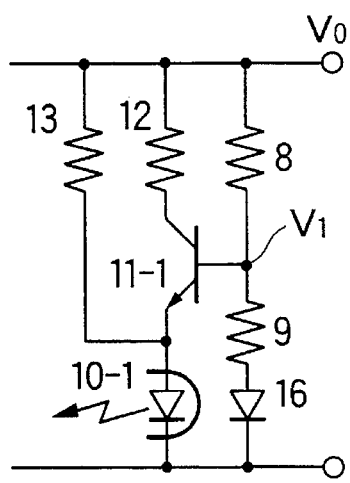
FIG. 4 is a circuit showing a main part of the third embodiment according to the present invention.

FIG. 4 is a circuit showing a main part of the third embodiment according to the present invention. Numerical references in FIG. 4 correspond to those in FIG. 2, and numerical numbers 16 is a diode for temperature compensation.

This embodiment represents a circuit in which the diode 16 for temperature compensation is added in order to compensate a variation based on a temperature change of a forward dropping voltage of the photo-coupler light emitting element 10-1. The forward dropping voltage of the photo-coupler light emitting element 10-1 to be the reference voltage has a temperature characteristic of about $-2$ mV/°C., which more or less varies according to the temperature change. Then, the diode having the temperature characteristic of the forward dropping voltage similar to that of the photo-coupler light emitting element 10-1 (a temperature characteristic of a forward dropping voltage of the diode is also usually about $-2$ mV/°C.) is, as required, connected between the voltage dividing resistor 9 and a negative side of the power source output to compensate the variation based on the temperature change of the forward dropping voltage of the photo-coupler light emitting element 10-1.

That is to say, by adding the diode 16 for temperature compensation, it is possible to allow both a variation of the emitter voltage of the transistor 11-1 according to a variation of the forward dropping voltage of the photo-coupler light emitting element 10-1 base on the temperature change and a variation of the base voltage of the transistor 11-1 according to a variation of the forward dropping voltage of the diode 16 for temperature compensation based on the temperature change to occur simultaneously and in the same level. Accordingly, a current flowing between the base and the emitter is independent of the temperature variation, so that the variation base on the temperature change of the forward dropping voltage of the photocoupler light emitting element 10-1 can be compensated. It should be noted that a plurality of diodes 16 for temperature compensation may be connected in series, as required. If so, it is possible to adjust the degree of temperature compensation by increasing or decreasing the number of the diode 16 for temperature compensation. It is needless to say that the diode 16 for temperature compensation may be a transistor connecting between its terminals so as to use as a diode.

Figure 5:
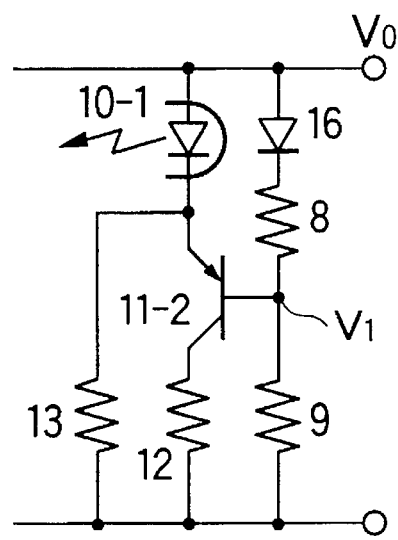
FIG. 5 is a circuit showing a main part of the fourth embodiment according to the present invention.

FIG. 5 is a circuit showing a main part of the fourth embodiment according to the present invention. Numerical references in FIG. 5 correspond to those in FIG. 4.

In each embodiment of FIGS. 2–4 as explained above, the transistor 11-1 according to an NPN bipolar transistor is used in an error amplifying means. In the fourth embodiment according to the present invention, the transistor 11-2 according to an PNP bipolar transistor is used in the error amplifying means. The current passes of the transistors are symmetric in the PNP type and the NPN type. However, there is no difference in operation and function of the transistor 11-2, the photo-coupler light emitting element 10-1 and the diode 16 for temperature compensation between the embodiments as shown in FIGS. 2 and 4, so that the explanation will be omitted.

It should be noted that the transistor for the error amplifier is not limited to the bipolar transistor and the other types of transistors may be used. In case that FET, for example, is used as a transistor for the error amplifier, a simple introduction is as follows.

Figure 6:
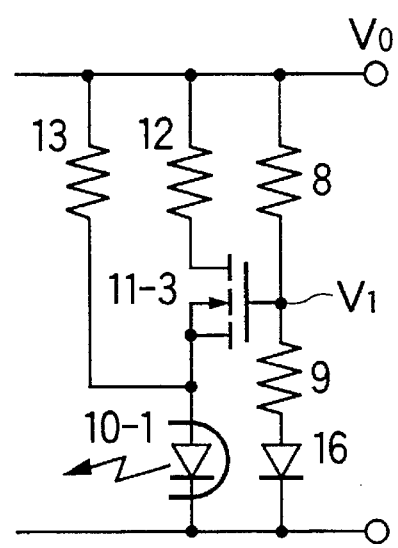
FIG. 6 is a circuit showing a main part of the fifth embodiment according to the present invention.

FIG. 6 is a circuit showing a main part of the fifth embodiment according to the present invention. Numerical references in FIG. 6 correspond to those in FIG. 4 and numerical references 11-3 is a transistor for the error amplifier according to an N-channel FET.

This embodiment has the same structure as the circuit shown in FIG. 4 except difference in a kind of transistor. Operation and function of the transistor 11-3, the photo-coupler light emitting element 10-1 and the diode 16 for temperature compensation are the same as the embodiments as shown in FIG. 4, so that the explanation will be unnecessary.

As described above, according to the isolated switching power source of the present invention, the forward dropping voltage of the photo-coupler light emitting element is utilized as the reference voltage, so that the reference voltage source for applying the reference voltage, which was necessary in the past, becomes unnecessary. Accordingly, the isolated switching power source that is cheap in cost can be realized. Also, because the conventional reference voltage source becomes useless, there is no waste power consumption in the present invention while waste power was spent in the conventional reference voltage source. Accordingly, improvement of the power conversion efficiency can be done. Further, inconvenient phenomenon that the forward dropping voltage of the photo-coupler light emitting element generates with more or less variation based on the temperature change can be easily improved by connecting the diode for temperature compensation and it is possible to supply a stable output voltage with a simple structure.

We claim:

1. In an isolated switching power source for controlling a voltage, comparing a voltage signal corresponding to an output voltage with a reference voltage to cause to generate a control signal according to a difference between the reference voltage and the voltage signal, by feeding back the control signal to a control circuit in an input side through a photo-coupler, the power source being characterized in that the reference voltage is a forward dropping voltage of a light emitting element of the photo-coupler, the photo-coupler light emitting element being used as the sole source of the reference voltage, in means for feeding back the control signal.

2. The isolated switching power source according to claim 1, wherein a semiconductor for compensating a variation based on a temperature change of the forward dropping voltage of the photo-coupler is connected to a detecting means of an output voltage to input a voltage signal corresponding to the output voltage to a comparing means for generating the control signal.

3. The isolated switching power source according to claim 2, wherein the semiconductor is a diode.

4. In an isolated switching power source for controlling a voltage, comparing a voltage signal corresponding to an output voltage with a reference voltage to cause to generate a control signal according to a difference between the reference voltage and the voltage signal, by feeding back the control signal to a control circuit in an input side through a photo-coupler, wherein a feedback means comprises:

a plurality of resistors, connected in series between a positive terminal and a negative terminal of the power source output, for obtaining the voltage signal corresponding to the output voltage;

a bipolar transistor element for generating the control signal by comparing the reference voltage with the voltage signal corresponding to the output voltage, connecting a base of the transistor element to a connection point of the resistors and an emitter of the transistor element to a source of the reference voltage; and a photo-coupler comprising a light emitting element connected between an emitter of the transistor element and one terminal of the power source output, the light emitting element being used as the sole source of the reference voltage, in means for feeding back the control signal; and wherein the reference voltage is a forward dropping voltage of the photo-coupler light emitting element.

5. The isolated switching power source according to claim 4, wherein the isolated switching power source includes a diode, connected in series to at least one resistor of said plurality of resistors for obtaining the voltage signal corresponding to the output voltage between the base of the transistor element and a terminal of a power source output to which the photo-coupler light emitting element is connected, for compensating a variation based on a temperature change of the forward dropping voltage of the photo-coupler light emitting element.

6. In an isolated switching power source for controlling a voltage, comparing a voltage signal corresponding to an output voltage with a reference voltage to cause to generate a control signal according to a difference between the reference voltage and the voltage signal by feeding back the control signal to a control circuit in an input side through a photo-coupler, wherein a feedback means comprises:

a plurality of resistors, connected in series between a positive terminal and a negative terminal of the power source output, for obtaining the voltage signal corresponding to the output voltage;

a field effect transistor element for generating the control signal by comparing the reference voltage with the voltage signal corresponding to the output voltage, connecting a gate of the transistor element to a connection point of the resistors and a source of the transistor element to a source of the reference voltage; and a photo-coupler comprising a light emitting element connected between the source of the transistor element and one terminal of a power source output, the light emitting element being used as the sole source of the reference voltage, in means for feeding back the control signal; and wherein the reference voltage is a forward dropping voltage of the photo-coupler light emitting element.

7. The isolated switching power source according to claim 6, wherein the isolated switching power source includes a diode, connected in series to at least one resistor of said plurality of resistors for obtaining the voltage signal corresponding to the output voltage between the gate of the transistor element and a terminal of a power source output to which the photo-coupler light emitting element is connected, for compensating a variation based on a temperature change of the forward dropping voltage of the photo-coupler light emitting element.

* * * * *